US008865239B2

(12) United States Patent
Levin

(10) Patent No.: US 8,865,239 B2
(45) Date of Patent: *Oct. 21, 2014

(54) HUMECTANT INFUSED JERKY TREAT

(75) Inventor: Mark A. Levin, Papillion, NE (US)

(73) Assignee: Sergeant's Pet Care Products, Inc., Omaha, NE (US)

( * ) Notice: Subject to any disclaimer, the term of this patent is extended or adjusted under 35 U.S.C. 154(b) by 560 days.

This patent is subject to a terminal disclaimer.

(21) Appl. No.: 12/338,380

(22) Filed: Dec. 18, 2008

(65) Prior Publication Data

US 2009/0148574 A1     Jun. 11, 2009

Related U.S. Application Data

(63) Continuation-in-part of application No. 11/292,530, filed on Dec. 2, 2005, now Pat. No. 8,057,838.

(51) Int. Cl.
| | |
|---|---|
| *A23J 3/04* | (2006.01) |
| *A23K 1/10* | (2006.01) |
| *A23K 1/18* | (2006.01) |
| *A23L 1/31* | (2006.01) |
| *A23L 1/312* | (2006.01) |
| *A23L 1/314* | (2006.01) |

(52) U.S. Cl.
CPC ............... *A23K 1/106* (2013.01); *A23K 1/1866* (2013.01); *A23L 1/31* (2013.01); *A23L 1/312* (2013.01); *A23L 1/31409* (2013.01); *Y10S 426/805* (2013.01)

USPC ........... 426/335; 426/332; 426/321; 426/455; 426/465; 426/656; 426/657; 426/641; 426/805

(58) Field of Classification Search
USPC ......... 426/656, 641, 805, 321, 335, 455, 465, 426/657, 332

See application file for complete search history.

(56) References Cited

U.S. PATENT DOCUMENTS

| | | | |
|---|---|---|---|
| 3,595,681 A * | 7/1971 | Kaplow et al. | 426/324 |
| 3,736,148 A * | 5/1973 | Katz | 426/656 |
| 3,745,027 A * | 7/1973 | Kaplow et al. | 426/331 |
| 4,070,490 A * | 1/1978 | Lugay et al. | 426/533 |
| 4,183,963 A * | 1/1980 | Brimelow et al. | 426/321 |
| 4,384,009 A * | 5/1983 | Lewis et al. | 426/646 |
| 4,868,002 A * | 9/1989 | Scaglione et al. | 426/641 |
| 5,731,029 A * | 3/1998 | Karwowski et al. | 426/646 |
| 5,773,070 A * | 6/1998 | Kazemzadeh | 426/573 |
| 7,282,235 B2 * | 10/2007 | Lombard et al. | 426/646 |

FOREIGN PATENT DOCUMENTS

GB     1583644 A  *  1/1981

* cited by examiner

*Primary Examiner* — Chhaya Sayala
(74) *Attorney, Agent, or Firm* — Polsinelli PC

(57) ABSTRACT

The invention relates to compositions and methods for making human consumable jerky treats. The invention provides moist, flavorful jerky treats and methods for making such treats.

11 Claims, No Drawings

HUMECTANT INFUSED JERKY TREAT

RELATED APPLICATIONS

This is a continuation-in-part of U.S. patent application Ser. No. 11/292,530, filed Dec. 2, 2005 for Animal By-Product Pet Treat now U.S. Pat. No. 8,057,838, which is incorporated herein by reference in its entirety.

FIELD OF THE INVENTION

The present invention relates to a moist jerky product having enhanced flavor retention following a cooking or drying process, as well as a method for making the jerky product. In particular, the jerky product is formed from a proteinaceous material and a humectant slurry.

BACKGROUND OF THE INVENTION

There are a number of methods to make jerky using proteinaceous material. Many of the methods employed in the industry result in a jerky that crumbles easily or results in products that look machine-made, seems artificial, or have a "plastic" looking exterior lacking the distinct rugged appearance of natural jerky. In addition to the unnatural appearance of jerky, often seasoning is lost through fat drippings during the preparation process, resulting in a less desired flavor. Typical jerky production includes the addition of flavors and spices to raw meat and then the raw meat is cooked and dried to a lower moisture content to stabilize the product against microbial growth. During this process, moisture and fat is lost along with volatile components of flavors causing a significant loss of flavor. Therefore, it is desirable to have a method of producing a jerky product that results in a moist product that retains a natural appearance and texture while having a full flavor. Further, it is desirable to have a method that reduces the amount of seasoning or flavor needed to result in a flavorful jerky product.

SUMMARY OF THE INVENTION

The present invention is directed to a jerky product formed from a proteinaceous material and an amount of a humectant slurry. The present invention also includes methods for producing the jerky product.

The process includes preparing the proteinaceous material, specifically, a jerky product, and contacting the proteinaceous material with a humectant slurry following traditional processing and drying of the jerky, to form the moist jerky product. The humectant slurry infuses into the prepared jerky product. The resultant jerky product will have an interactivity such that growth of bacteria and fungus will be inhibited. Even though the water activity is comparatively low, the amount of water present will be sufficient to prevent the treat from being brittle or hard. As such, the water will cause the jerky snack to be soft and pliable. Further, a flavor infused humectant slurry infused into the traditionally processed jerky following the cooking and drying process will not see the fat and flavor loss traditionally experienced during the preparatory cooking and drying process. Specifically, a process is practiced where a jerky product is prepared and then contacted with a humectant slurry. The slurry is not added prior to cooking, drying or curing.

Ultimately, for example, a beef jerky product can be produced having a soft pliable texture with reduced water activity and enhanced flavor retention.

DETAILED DESCRIPTION

In accordance with the present invention, a process for making a moist jerky product, retaining flavor throughout the production process has been discovered.

The jerky product of the invention is generally prepared by a process that includes heating, cooking, drying, smoking, or otherwise curing a proteinaceous material and then contacting the proteinaceous material with a humectant slurry. The proteinaceous material may be derived from a variety sources including domesticated farm animals, wild game, fibrous plant material, or combinations thereof. The proteinaceous material may be whole muscle or reformed material. For example, the proteinaceous material may be derived from beef, pork, lamb, chicken, turkey, wild game, venison, elk, caribou, moose, ostrich, salmon, alligator, tuna, pheasant, and mixtures thereof. In addition, the humectant slurry may be contacted with proteinaceous materials, such as soy or vegetable-based products including soy, soy burger additives, or vegetable by-products.

The proteinaceous material is heated at a temperature and time sufficient to kill or substantially reduce the indigenous microorganisms and dehydrate the material. The kill should be sufficient to prevent repopulation of the microorganisms, and of a level sufficient to prevent a subject that later consumes the jerky product from getting sick. The heating operation may be accomplished using a variety of devices and methods. For example, the heating operation may be achieved by using direct or indirect heating. Examples of direct heating include, but are not limited to, heating with hot air, steam, hot water, direct flame, or ionized energy. Examples of indirect heating include heating through heat exchangers, or other heating operations. A typical heating operation includes placement of the thinly cut product in a heated room or walk-in oven wherein the proteinaceous material can be cooked and dried in bulk. Preferably, the process includes using conventional heating, radiant heating, dehydration, smoking or some other form of "dry" heating. Dry heating will not only cook the product, but causes the removal of moisture present in the by-products.

Any of a variety of temperatures may be used to cook the product so long as microorganisms are killed and some water is evaporated. Preferably, the heating operation includes heating the jerky product at a temperature of from about 49° C. to about 160° C., more preferably from about 60° C. to about 140° C. The heating operation will last for between about 30 minutes to about 48 hours. The selected time and temperature should be sufficient to reach a moisture content of from about 10% to about 35% by weight of the finished product, more preferably from about 15% to about 25% by weight. Of course those skilled in the art will appreciate that the heating time will vary depending on the materials being heated and the desired outcome, as the jerky products will vary in size, density, and shape.

In addition, if the desired moisture content is not achieved during the heating operation an additional drying operation may be necessary. Generally, any method of removing additional moisture from the jerky product may be used. For example, the heated jerky product may be placed on a drying rack at ambient conditions until the desired moisture is achieved. Alternatively, the heated jerky product may be subjected to additional direct or indirect heating to achieve the desired moisture.

In accordance with the present invention it has been discovered that a humectant slurry may be added to a heated and dried, to some degree, jerky product to increase the moisture content, maintain low water activity of the jerky product, and make the jerky product softer and easier to chew. Further, the humectant slurry provides a means to add flavoring to the jerky product after heating such that the flavoring is not lost through the fat drippings or volatilized during the drying process. Specifically, flavors that are traditionally added during processing can be excluded until the slurry is added. Specifically, this means flavoring does not have to be added prior to heating. The humectant slurry allows for less flavoring to be used to result in the desired flavor. A humectant is a hygeroscopic substance that is generally used as a food additive. The hygroscopic substance binds water, such that the water is not available to microorganisms. Further, the presence of water maintains the pliable nature of the product and retains the desired flavoring. In addition, because a humectant binds water, bacterial or mold growth, that could potentially occur when moistened food products are left at ambient conditions, is prevented.

As such, after the heated jerky product is removed from the heating apparatus it is subjected to an infusion operation where a humectant slurry is contacted with the heated jerky product. Essentially, the humectant or humectant slurry will infuse into the product due to concentration differences, moisture differences, and pressure differences. Preferably, the heated jerky product is contacted with a humectant or humectant slurry at a temperature and for a time sufficient to infuse the humectant to a desired level and soften the jerky product.

Preferably, the infusion operation generally comprises contacting the proteinaceous material with a humectant or humectant slurry in a suitable vessel to moisten the prepared jerky product. Typically, the temperature of the humectant during the infusion operation is from about 18° C. to about 43° C., more preferably from about 23° C. to about 38° C. Typically, the infusion operation lasts for between 10 minutes and 48 hours, preferably from about 20 minutes to about 24 hours. Alternatively, the humectant slurry may be vacuum infused into the cooked jerky product.

Preferably, the humectant is selected from the group comprising propylene glycol, glycerin, sorbitol, mannitol, xylitol, maltitol, corn syrup, sugars, alcohol sugars, mineral salts, metal salts, and mixtures thereof. The humectant may be derived from metal and mineral salts, such as sodium chloride, calcium chloride, potassium chloride, among others. The preferred humectant used in the infusion operation is propylene glycol, glycerin, or mixtures thereof. Of course those skilled in the art will appreciate that any other humectant suitable for consumption may be used in accordance with the present invention.

In general, the infusion operation comprises contacting the jerky product with a mixture of a humectant and water (humectant slurry). The humectant slurry may also include flavor additives such as seasonings or spices. It may also be desired to add mold inhibitors or antimicrobials to the humectant slurry. In general, the strength or concentration of the humectant and water mixture may vary depending on the initial moisture content present in the jerky product being infused and the desired moisture of the resultant jerky product. The mixture will be a solution of from about 30% to about 99% by weight humectant and from about 1% to about 70% by weight water. Preferably, the infusion operation comprises contacting the jerky product with a mixture of from about 50% to about 90% by weight humectant and from about 20% to about 60% by weight water.

Generally, a moist jerky product is a jerky product having soft and pliable characteristics reminiscent of a higher moisture-containing product. Those skilled in the art will appreciate that the moisture content will vary depending on the desired texture of the jerky product and the humectant type. Acceptably low moisture content can lead to a safe or shelf stable water activity.

The process of making a moist jerky product may be conducted in a batch, semi-continuous, or continuous mode and it may be carried out using a variety of apparatus and process techniques. In some instances, some process steps may be omitted or combined with other process steps without departing from the scope of the present invention.

After the infusion operation, the jerky product may be subjected to a removal operation, whereby excess solution is removed from the jerky product. Preferably, after the jerky product is removed from the mixture of humectant and water it is placed on a drying rack at ambient conditions so that any excess mixture is either absorbed by the jerky product or air dried. An alternate method for removing excess solutions is by physically expelling the solution by compression.

The resultant jerky product has at least about 50% by weight of proteinaceous material. Preferably, the resultant jerky product comprises from about 40% to about 90% by weight of proteinaceous material, more preferably from about 45% to about 80% by weight of proteinaceous material, from about 5% to about 30% by weight humectant, and from about 5% to about 25% by weight water. In addition, the jerky product of the present invention will have a water activity of less than about 0.8, more preferably less than about 0.75, even more preferably less than about 0.65, and yet more preferably less than about 0.6.

In addition to a jerky product and humectant, the resultant jerky product may comprise other additives such as seasonings, flavoring, or coloring agents to improve the taste and or appearance of the jerky product. It may be desired from time to time to add mold inhibitors or acidifying agents when critical levels of water are added. In addition, the present invention may also include herbal extracts for health benefits, enzymes for digestive disorders, and vitamins for nutritional benefits, among others.

The resultant jerky product of the invention retains its softness or moisture. In fact, the resultant jerky product of the present invention retains its moisture even after exposed to atmospheric conditions for an extended period of time.

DEFINITIONS

Water activity, or $a_w$, is the relative availability of water in a substance. It is defined as the vapor pressure of water in a product divided by that of pure water at the same temperature. Higher $a_w$ substances tend to support the life and propagation of microorganisms. Bacteria usually require water activities of at least 0.91, fungi at least 0.7, and mold as low as 0.62.

Heating, or cooking, is a process that kills or substantially reduces the indigenous microorganisms (depending on temperature, cooking time, and technique used). It is desired to reach a minimum temperature of 60° C. (140° F.) and hold for at least 30 minutes to achieve the minimum pasteurization eliminating pathogenic bacteria and reducing microorganism counts in the by-product.

EXAMPLES

As can be appreciated from the disclosure provided above, the present invention has a wide variety of applications. Accordingly, the following examples are offered for illustration purposes and are not intended to be construed as a limitation on the invention in any way. Those of skill in the art will readily recognize a variety of non-critical parameters that could be changed or modified to yield essentially similar results.

Example 1

Beef Jerky

Fresh beef loin was sliced into ½" thick slices and placed in an oven. The raw beef slices were cooked and dried at 140° F. for 24 hours. After 24 hours the cooked and dried beef had a moisture content of about 8% with a hard crunchy texture. The cooked and dried slices were soaked in a solution of humectant and water of 60% glycerin and 40% water for 48 hours. The humectant solution infused into the beef slices and formed a shelf stable soft product with high palatability.

Example 2

Commercially Humectant Infused Beef Jerky

Commercially available beef jerky slices were soaked in a solution of humectant and water of 60% glycerin and 40% water for 48 hours. The humectant solution infused into the beef slices and formed a shelf stable soft product with high palatability.

Example 3

Teriyaki Humectant Infused Commercially Available Beef Jerky

Commercially available beef jerky slices were soaked in a solution of humectant, teriyaki flavoring, and water comprising 60% glycerin and 40% water for 48 hours. The teriyaki humectant solution infused into the beef slices and formed a shelf stable soft product with high palatability.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the claims.

I claim:

1. A method for preparing a humectant infused jerky product, wherein the method comprises:
   a. dehydrating a sliced proteinaceous material to form a jerky product having a total moisture content of from about 10% to about 35% by weight; and,
   b. then contacting the dehydrated jerky product with a humectant slurry at a temperature and for a time sufficient to infuse the humectant into the jerky product and form a humectant infused jerky product having a water activity of less than about 0.8.

2. The method of claim 1, wherein the proteinaceous material is whole muscle derived from a source selected from the group consisting of a domesticated farm animal, wild game, and mixtures thereof.

3. The method of claim 1, wherein dehydrating the sliced proteinaceous material comprises cooking and drying the sliced proteinaceous material at a temperature of from about 49° C. to about 160° C. for between about 30 minutes and 48 hours.

4. The method of claim 1, wherein the moist humectant infused jerky product comprises between about 5% and about 60% by weight humectant.

5. The method of claim 1, wherein the humectant is selected from the group consisting of propylene glycol, glycerin, sorbitol, mannitol, xylitol, maltitol, corn syrup, sugars, alcohol sugars, mineral salts, and combinations thereof.

6. The method of claim 1, wherein the humectant slurry comprises from about 40% to about 99% by weight humectant and from about 1% to about 60% by weight water.

7. The method of claim 1, wherein the humectant infused jerky product has a water activity of about 0.65.

8. The method of claim 1, wherein the humectant slurry further comprises flavor additives.

9. A method of preparing a moist humectant infused jerky product, wherein the method comprises:
   a. dehydrating a sliced proteinaceous material to form a jerky product having a moisture content of from about 10% to about 35% by weight; and
   b. then contacting the dehydrated jerky product with a humectant slurry at a temperature and for a time sufficient to infuse the humectant into the jerky product to form a moist humectant infused jerky product having a water activity of less than about 0.8; wherein the humectant slurry further comprises flavor additives.

10. The method of claim 1, further comprising soaking the dehydrated jerky product in a humectant slurry at a temperature and for a time sufficient to infuse the humectant into the jerky product to form a moist humectant infused jerky product.

11. A method for preparing a humectant infused jerky product, wherein the method comprises:
   a. dehydrating sliced whole muscle derived from a source selected from the group consisting of a domesticated farm animal, wild game, and mixtures thereof to form a jerky product having a total moisture content of from about 10% to about 35% by weight; and,
   b. then contacting the dehydrated jerky product with a humectant slurry at a temperature and for a time sufficient to infuse the humectant into the jerky product and form a humectant infused jerky product having a water activity of less than about 0.8.

* * * * *